(12) United States Patent
Kataoka (10) Patent No.: US 8,255,014 B2
(45) Date of Patent: Aug. 28, 2012

(54) MOBILE TERMINAL HAVING A LIGHT SOURCE

(75) Inventor: Eiji Kataoka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 495 days.

(21) Appl. No.: 12/363,656

(22) Filed: Jan. 30, 2009

(65) Prior Publication Data

US 2009/0209302 A1  Aug. 20, 2009

(30) Foreign Application Priority Data

Jan. 30, 2008  (JP) ................................. 2008-019846

(51) Int. Cl.
*H04M 1/00* (2006.01)
(52) U.S. Cl. .................. 455/575.1; 455/556.2; 455/567; 455/575.3; 455/90.3; 379/433.01; 315/169.3
(58) Field of Classification Search ............... 455/575.1, 455/550.1, 556.2, 567, 575.3, 90.3, 418; 379/433.01; 315/169.3; 348/14.02
See application file for complete search history.

(56) References Cited

U.S. PATENT DOCUMENTS

| | | | |
|---|---|---|---|
| 7,336,980 B1* | 2/2008 | Kaikuranta et al. | 455/575.6 |
| 7,421,269 B2* | 9/2008 | Kostiainen et al. | 455/418 |
| 7,534,010 B2 | 5/2009 | Yeh et al. | |
| 2007/0105604 A1* | 5/2007 | Choo et al. | 455/575.3 |
| 2007/0298851 A1* | 12/2007 | Yamazaki et al. | 455/575.3 |
| 2008/0037771 A1* | 2/2008 | Black et al. | 379/433.01 |

FOREIGN PATENT DOCUMENTS

| | | |
|---|---|---|
| JP | 2004-354731 | 12/2004 |
| JP | 2005-303660 | 10/2005 |
| JP | 2007-068004 | 3/2007 |

* cited by examiner

*Primary Examiner* — Shaima Q Aminzay
(74) *Attorney, Agent, or Firm* — Duane Morris LLP (57) ABSTRACT

A mobile terminal includes a base including a plurality of light transmission parts, with at least one light source inside the base. A plurality of light guides may be connected to the plurality of light transmission parts from the outside of the base. Each light guide includes a first surface for reflecting light emitted from the at least one light source, and a first light reflector in a first area which is at least a part of an outer circumference of the base.

8 Claims, 6 Drawing Sheets

FIG. 7

MOBILE TERMINAL HAVING A LIGHT SOURCE

CROSS-REFERENCE TO RELATED APPLICATIONS

The present application claims priority under 35 U.S.C. §119 to Japanese Patent Application No. 2008-019846, filed Jan. 30, 2008, the content of which is incorporated herein by reference in its entirety.

BACKGROUND OF THE INVENTION

1. Field of the Invention

The present invention relates to a mobile terminal having a light source which emits light.

2. Description of the Related Art

A mobile terminal having a light emitting structure which makes at least a part of housing emit light is known. The mobile terminal having a light emitting structure is configured so that the light emitting structure emits light through a certain operation, for example, a voice transmitting/receiving operation, a mail transmitting/receiving operation, an opening/closing operation of a foldable mobile terminal, and so on. The mobile terminal having a light emitting structure can inform a mobile terminal user of an incoming call, an incoming mail, etc. by emitting light, while the user need not see a display of a display unit. As for such a mobile terminal having a light emitting structure, there is a technology disclosed in Japanese Patent Application Laid-Open No. 2007-68004.

However, the mobile terminal disclosed in Japanese Patent Application Laid-Open No. 2007-68004 has a disadvantage in that housing strength decreases because an opening is formed in the housing based on position, size, extent, etc. of the area which emits light. Also, the mobile terminal has a disadvantage in that when reducing the size of the opening in order to maintain the housing strength, the area which emits light decreases in proportion to the reduction size.

SUMMARY OF THE INVENTION

The exemplary embodiments described herein are directed to solving one or more of the problems presented in the prior art, as described above, as well as providing additional features that will become readily apparent by reference to the following detailed description when taken in conjunction with the accompanying drawings.

In one embodiment, a mobile terminal includes a base including a plurality of light transmission parts, and at least one light source inside the base. The mobile terminal further includes a plurality of light guides connected to the plurality of light transmission parts from the outside of the base, where each light guide includes a first surface for reflecting light emitted from the at least one light source. The mobile terminal may further include a first light reflector in a first area which is at least a part of an outer circumference of the base.

Yet another embodiment is directed to a mobile terminal including a base comprising a plurality of light transmission parts and a plurality of light sources inside the base. A plurality of light guides may be connected to the plurality of light transmission parts from the outside of the base, each light guide comprises a first surface for reflecting light emitted from the plurality of light sources. A first light reflector may be in a first area which is at least a part of an outer circumference of the base. According to certain embodiments, each of the plurality of light sources is located at a position corresponding to each of the plurality of light transmission parts.

BRIEF DESCRIPTION OF THE DRAWINGS

The present disclosure, in accordance with one or more embodiments, is described in detail with reference to the following figures. The drawings are provided for purposes of illustration only and merely depict typical or exemplary embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

The word "exemplary" is used herein to mean "serving as an example or illustration." Any aspect or design described herein as "exemplary" is not necessarily to be construed as preferred or advantageous over other aspects or designs.

A mobile terminal 100 of an embodiment will be described below.

The following mobile terminal of the embodiment is assumed to be a foldable mobile phone for exemplary purposes; however, various types of mobile terminals may be used without departing from the scope of the present invention.

Figure 1:
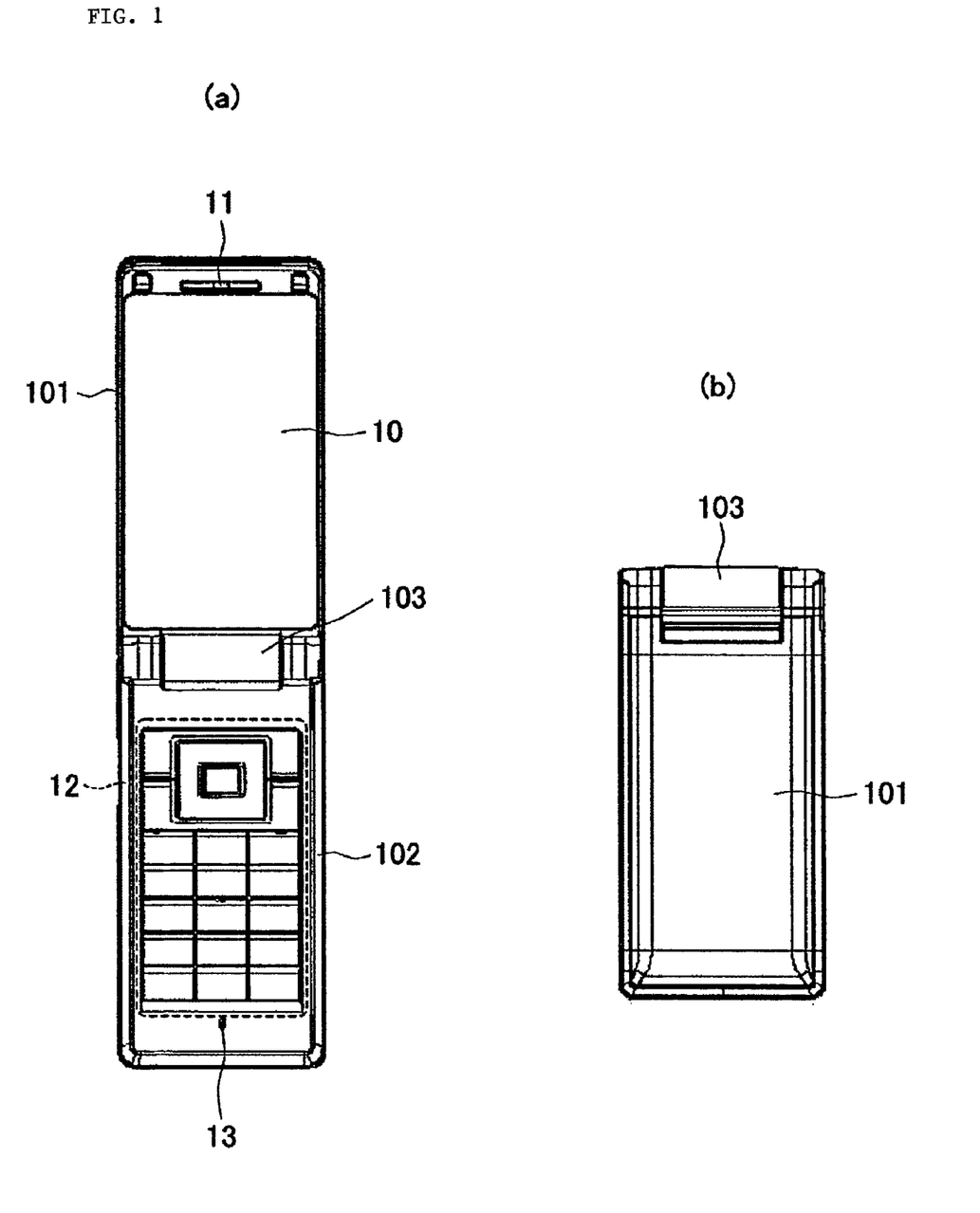
FIGS. 1(A) and 1(B) are external views illustrating an example of a mobile terminal, according to one embodiment.

FIGS. 1(A) and 1(B) are an external view illustrating an example of a mobile terminal 100 of one embodiment. FIG. 1A illustrates an unfolded state (open state) of the mobile terminal 100 and FIG. 1B illustrates a folded state (closed state) of the mobile terminal 100. As shown in FIGS. 1A and 1B, the mobile terminal 100 has a display device 10, a first housing 101 including the display device 10 and a speaker 11, and a second housing 102 including an operation unit 12 and a microphone 13. The first housing 101 and the second housing 102 are connected and engaged with each other via a hinge unit 103. The hinge unit 103 includes a hinge mechanism which enables the first housing 101 and the second housing 102 to rotate against each other. The first housing 101 and the second housing 102 can transit between the open state of the mobile terminal 100 shown in FIG. 1A and the closed state of the mobile terminal 100 shown in FIG. 1B, by the hinge unit 103. The first housing 101 includes a light emitting structure in which at least a part of an outside exposed surface of the first housing 101 emits light.

Next, a structure of the first housing 101 will be described, according to one exemplary embodiment.

Figure 2:
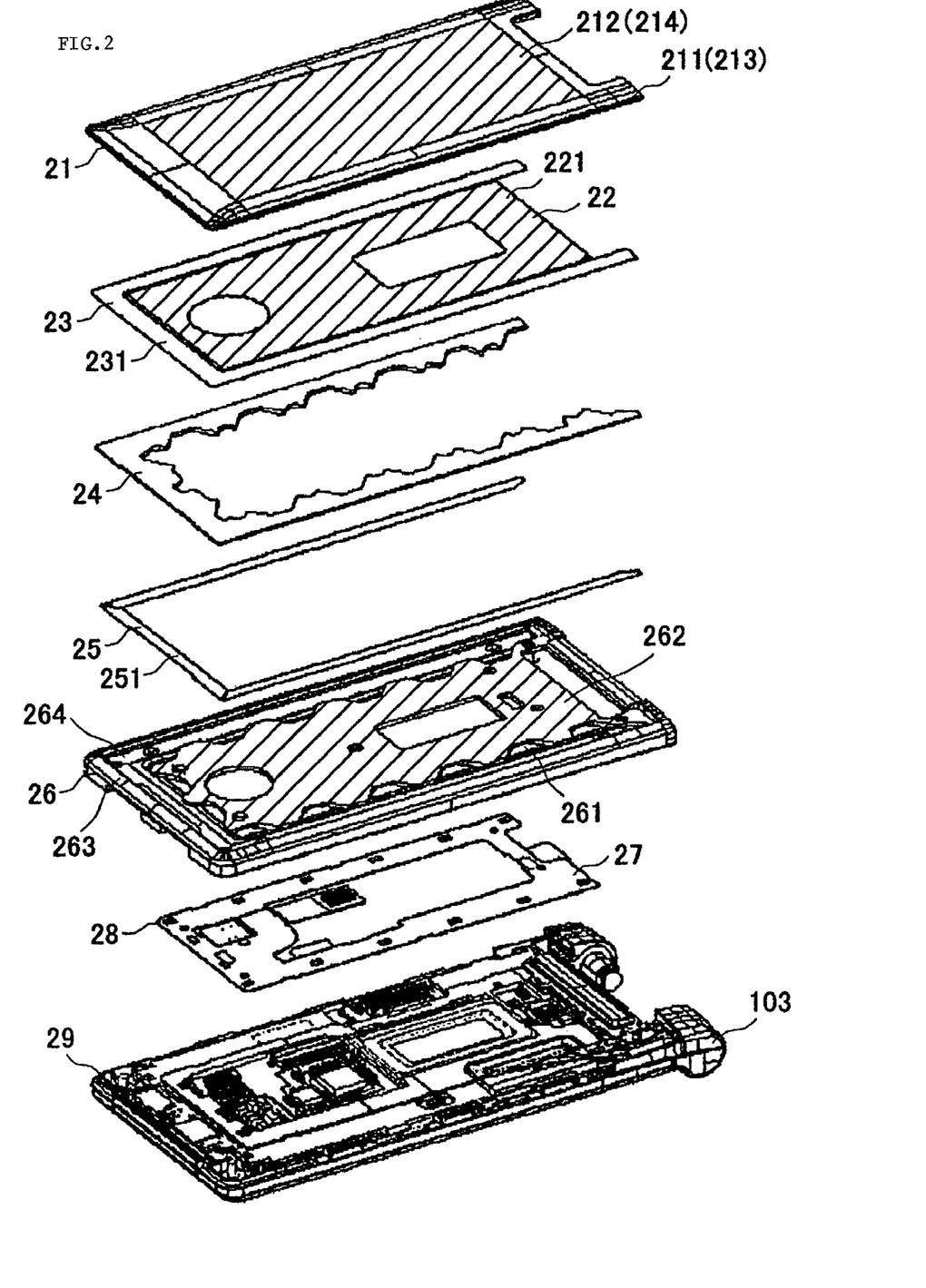
FIG. 2 is an exploded perspective view of a light emitting structure of a first housing, according to one embodiment.

FIG. 2 is an exploded perspective view of the exemplary first housing 101. In FIG. 2, a side marked with reference numeral 21 is a side which is exposed to the outside when the mobile terminal 100 is in the closed state, and a side marked with reference numeral 29 is a side which is covered from the outside by the second housing 102 when the mobile terminal 100 is in the closed state.

As shown in FIG. 2, the first housing 101 is configured by stacking a rear plate 21, a double-sided tape 22, a double-sided tape 23, a light guide 24 (corresponding to a first light guide of the claim), a double-sided tape 25 (corresponding to a first light reflector of the claim), a rear case 26 (corresponding to a base of the claim), a flexible substrate 27 on which LEDs (Light Emitting Diodes) 28 (corresponding to light sources of the claim) are mounted, and a front case 29. In the first housing 101, a configuration of various electronic components, etc. which control operations of the display device 10 and the speaker 11 are inserted and retained between the rear case 26 and the front case 29 (more specifically, between the flexible substrate 27 and the front case 29). However, description of the configuration is omitted in the embodiment.

The rear plate 21 is a plate material formed of, for example, a strengthened glass and/or resin plate. The rear plate 21 is arranged on the rear case 26 via the double-sided tape 22 and the double-sided tape 23 so that the rear plate 21 is exposed to the outside during the closed state of the mobile terminal 100 to constitute a main surface of the first housing 11. In the embodiment, the rear plate 21 is formed by separating an edge area 211 from a center area 212. The double-sided tape 22 is a double-sided adhesive material in which a tape surface facing the outside of the first housing 101 is adhered to the center area 212 of the rear plate 21 and a tape surface facing the inside of the first housing 101 is adhered to a center area 262 of the rear case 26. A shape and size of the double-sided tape 22 are formed to approximately the same as those of the center area 212 of the rear plate 21.

The double-sided tape 23 is a double-sided adhesive material in which a tape surface facing the outside of the first housing 101 is adhered to the edge area 211 of the rear plate 21 and a tape surface facing the inside of the first housing 101 is adhered to the light guide 24. A shape and size of the double-sided tape 23 are formed to approximately the same as those of the edge area 211 of the rear plate 21.

The light guide 24 is a light diffusing material formed of a near-transparent material, for example, a polycarbonate resin, etc. having a high light diffusion rate. A light guide 24 surface facing the outside of the first housing 101 is adhered to the double-sided tape 23 and a light guide 24 surface facing the inside of the first housing 101 is adhered to the double-sided tape 25, so that the light guide 24 is arranged on the rear case 26. Since the light guide 24 is arranged in the rear case 26 to face the LED 28 in a width direction of the first housing 101, as a result the light guide 24 is arranged between the LED 28 and the double-sided tape 25. A size of light guide 24 is formed to approximately the same as that of the edge area 211 of the rear plate 21.

The double-sided tape 25 is a double-sided adhesive material in which a tape surface facing the outside of the first housing 101 is adhered to the light guide 24 and a tape surface facing the inside of the first housing 101 is adhered to the edge area of the rear case 26. A shape and size of the double-sided tape 25 are formed to approximately the same as those of the edge area 211 of the rear plate 21.

The rear case 26 is a case body formed of a resin, etc. The rear case 26 is engaged with the front case 29 at their peripheral edges, and forms an external appearance of the first housing 101. In the rear case 26, a plurality of openings 261 are formed so as to divide the center area 262 from the edge area 263.

Figure 3:
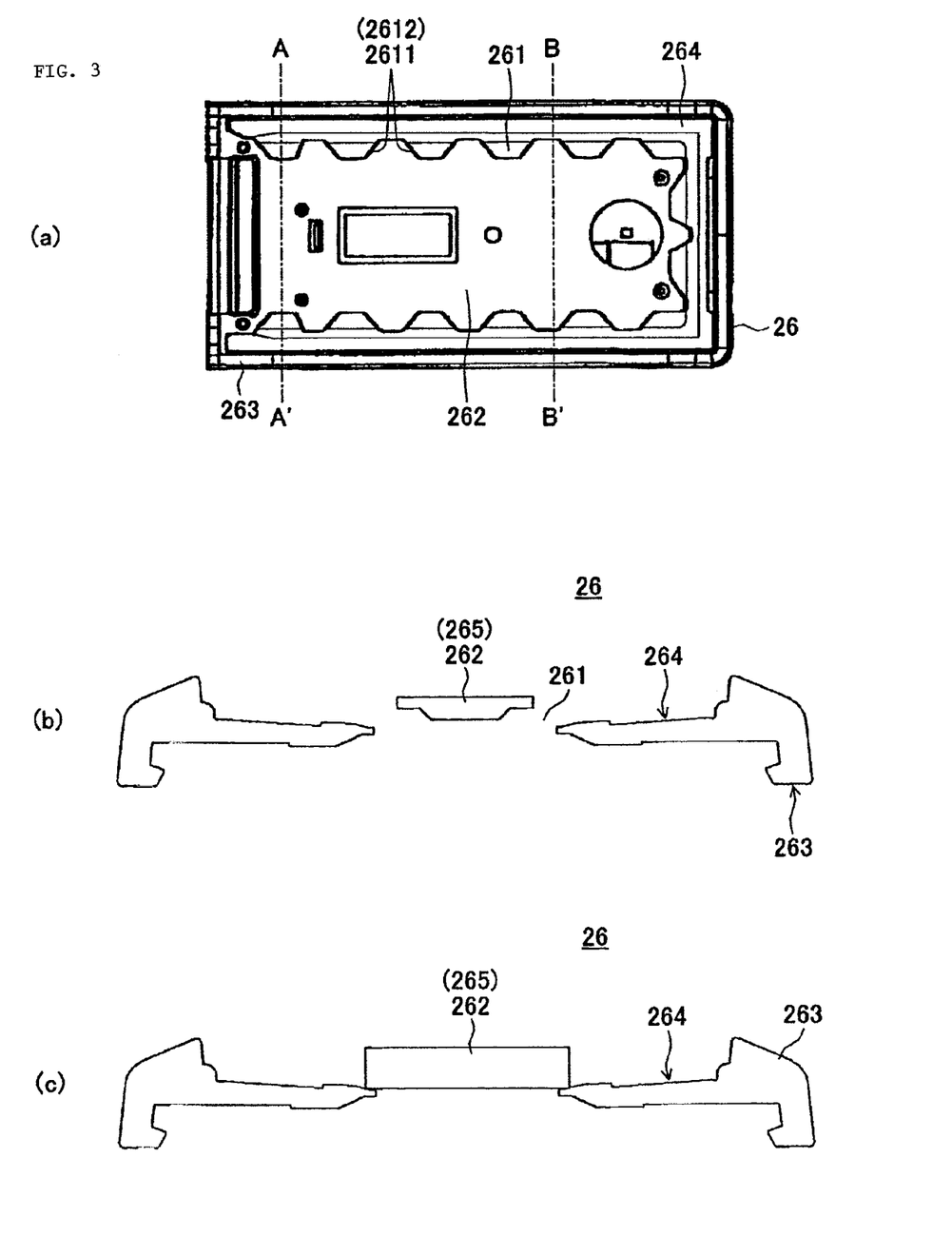
FIGS. 3(A)-3(C) illustrate a shape of a rear case, according to one embodiment.

FIG. 3 illustrates a shape of a rear case 26, according to one embodiment.

FIG. 3A is a diagram of the exemplary rear case 26 seen from outside front of the first housing 101. As shown in FIG. 3A, the rear case 26 has the plurality of openings 261 (corresponding to light transmission parts of the claim), the center area 262, the edge area 263, and a tape adhesion part 264.

The openings 261 which are plurally opened in the rear case 26 are hole parts or openings for transmitting light emitted from the LEDs 28. The opening 261, the number of which is the same as that of the LEDs 28, according to the depicted example, are provided in the rear case 26. As shown in FIG. 3A, the openings 261 are each formed to be an approximately trapezoid shape when seen from the outside front of the first housing 101. On the side lines of the trapezoid shape, slope parts 2611 tilting against a width direction of the first housing 101 are formed. The slope parts 2611 function as light guides 2612 for guiding light emitted from the LEDs 28 to a first area. FIG. 3B illustrates a cross-sectional view in a width direction of the rear case 26 taken from line A-A' in FIG. 3A. As shown in FIG. 3B, the openings 261 are opened between the center area 262 and the edge area 263 of the rear case 26. Although, in the exemplary embodiment, the rear case 26 and the light guides 2612 are integrally formed, both parts can be formed separately and adhered via another material, instead.

The center area 262 is a material which constitutes a part near the center of the rear case 26, and is constituted as a light shield part 265 which shields light in order to prevent light emitted from the LEDs 28 from leaking from any part other than the openings 261. The center area 262 has a step structure which is one step higher than the edge area 263 to be described below. FIG. 3C illustrates a cross-sectional view taken from line B-B' shown in FIG. 3A. FIG. 3C is a cross-sectional view of the rear case 26 in the width direction of the first housing 101 at a position which does not cross the openings 261, and the rear case 26 is formed by combining the center area 262 and the edge area 263. As shown in FIGS. 3A to 3C, the edge area 263 is a material which constitutes peripheral edges (edge parts) of the rear case 26. Since the center area 262 and the edge area 263 are combined, the light shield part 265 constituted by the center area 262 does not leak the light emitted from the LEDs 28 from any part other than the openings 261.

A tape adhesion part 264 is a space for adhering the double-sided tape 25, and provided in a slightly sunk position in the edge area 263 of the rear case 26. The tape adhesion part 264 forms a slope slanting in the thickness direction of the first housing 101, from the peripheral edges to the center of the rear case 26 as shown in FIG. 3B, for efficiently reflecting and diffusing the light emitted from the LEDs 28 in the thickness direction of the first housing 101 by the adhered double-sided tape 25. A tilting angle of the tape adhesion part 264 is not limited in this embodiment. Empirically, the tilting angle may be an angle in which the light emitted from the LEDs 28 is reflected and diffused effectively in the thickness direction of the first housing 101. Since the light guide 24 is further adhered to the double-sided tape 25 which is adhered to the tape adhesion part 264, the light guide 24 is arranged approximately right above the tape adhesion part 264.

The flexible substrate 27 is a circuit substrate for performing various controls corresponding to a control of a controller not shown in FIG. 2. On the flexible substrate 27 of the embodiment, the plurality of LEDs 28 are mounted on a flexible substrate surface facing the outside of the first housing 101, and a circuit for transmitting control signals from the controller to each LED 28 is formed. And, on the flexible substrate 27, the plurality of LEDs 28 are arranged in the first housing 101, corresponding to the plurality of openings 261 formed in the rear case 26. The not shown controller is configured so that some of the LEDs 28 can emit light and also all of the LEDs 28 can emit light at the same time. The LEDs 28 are light source parts configured by, for example, light emitting diodes, etc.

Figure 4:
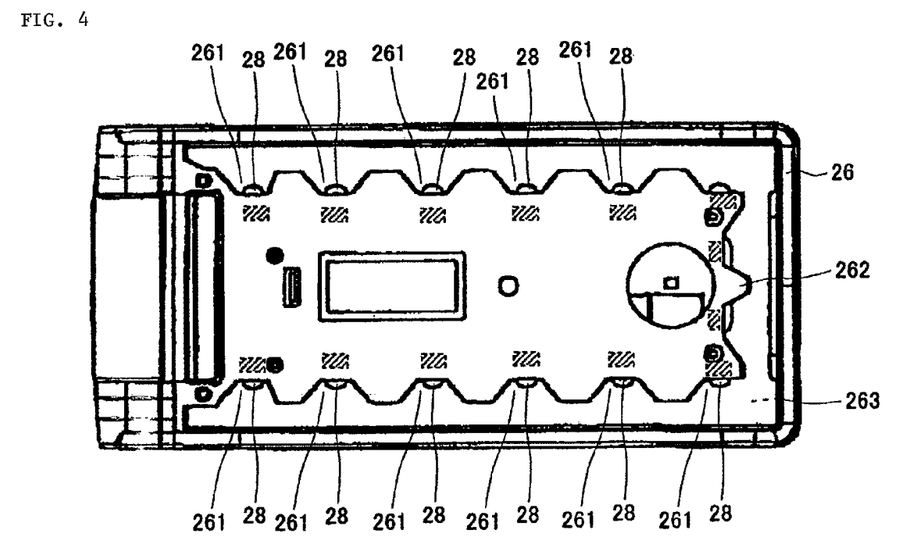
FIG. 4 illustrates a plurality of LEDs corresponding to openings on a flexible substrate in the rear case, seen from outside front of the first housing, according to one embodiment.

FIG. 4 illustrates a plurality of LEDs 28 corresponding to openings on a flexible substrate 27 in the rear case 26 corresponding to the openings 261, seen from outside front of the first housing 101. Since the LEDs 28 are located inside the center area 262 of the rear case 26, the LEDs 28 in the rear case 26 cannot be seen when the rear case 26 is seen from the outside front of the first housing 101. Therefore, in FIG. 4, the LEDs 28 are shown through circling with dotted lines.

Figure 5:
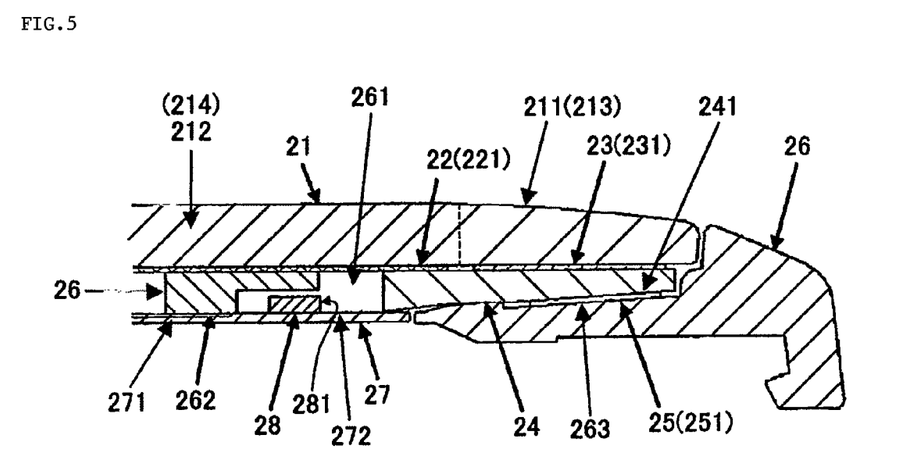
FIG. 5 is a cross-sectional view taken from line A-A' shown in FIG. 3, according to one embodiment.

FIG. 5 is a cross-sectional view taken along a line going through one of the plurality of LEDs 28, in the width direction of the first housing 101. As shown in FIG. 5, the light guide 24 is arranged on a rear case 26 edge area 263 surface facing the outside of the first housing 101 via the double-sided tape 25. In a light guide 24 surface facing the inside of the first housing 101, a slope surface 241 tilting to the edge area 211 of the rear plate 21 is formed. Therefore, in the rear case 26 edge area 263 surface facing the outside of the first housing 101, on which the double-sided tape 25 is adhered, a slope surface tilting at approximately the same angle as that of the slope surface 241 is formed, corresponding to the slope surface 241. As a result, the light emitted from the LEDs 28 is surely directed on a light diffusion part 251.

The double-sided tape 25 is formed of a material having a high light diffusion rate and reflection rate (for example, a material colored by white type color), and constitutes the light diffusion part 251. On a rear case 26 surface facing the outside of the first housing 101, the rear plate 21 is arranged via the double-sided tape 22 and the double-sided tape 23. Specifically, in the rear plate 21, the center area 212 is adhered to the center area 262 of the rear case 26, and the edge area 211 is adhered to the double-sided tape 23 which is adhered to the light guide 24 surface facing the outside of the first housing 101. As a result, the rear plate 21 is arranged on the rear case 26 surface facing the outside of the first housing 101.

The center area 212 of the rear plate 21 is formed of a material having a low light transmission rate (for example, a material colored by black type color which has a low light transmission rate), and constitutes a light shield part 214. And, the double-sided tape 22 adhered to the center area 212 of the rear plate 21 is also formed of a material having a low light transmission rate (for example, a material colored by black type color), and constitutes the light shield part 221. On the other hand, the edge area 211 of the rear plate 21 is formed of a material having a high light transmission rate (for example, a transparent material or a semi-transparent material), and constitutes a first light transmission part 213. And, the double-sided tape 23 adhered to the edge area 211 is also formed of a material having a high light transmission rate (for example, a transparent material or a semi-transparent material), and constitutes a second light transmission part 231.

On the other hand, the flexible substrate 27 is arranged inside the rear case 26 so as to form a facing part 271 facing an inside surface of the first housing 101 in the center area of the rear case 26, and an extending part 272 extending to the openings 261 formed in the rear case 26. And the LEDs 28 are arranged on an extending part 272 surface facing the outside of the first housing 101. The LEDs 28 are mounted on the extending part 272 of the flexible substrate 27 so that a light emitting surface 281 faces the width direction of the first housing 101 which is an actual direction for emitting light, specifically, the light emitting surface 281 faces the edge area 263 from the center area 262 of the rear case 26.

Next, an exemplary route through which the light emitted from the LEDs 28 passes will be described using FIG. 6.

Figure 6:
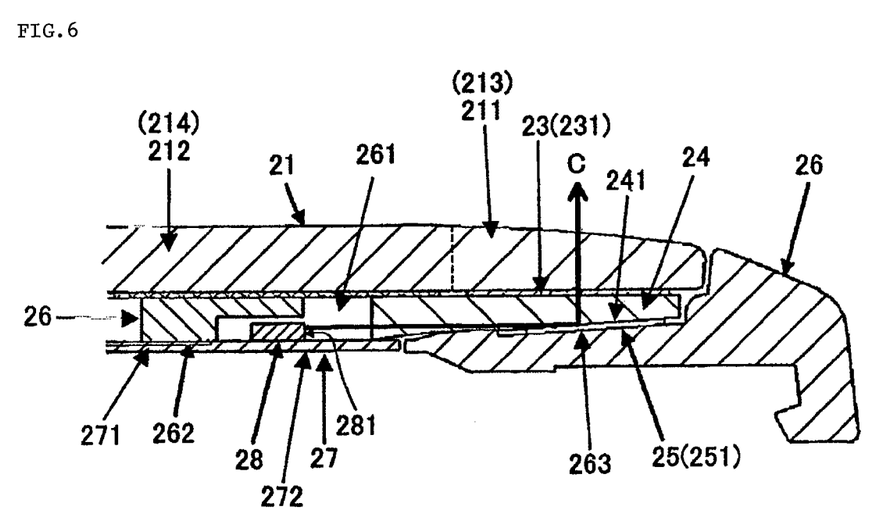
FIG. 6 illustrates a route in which light emitted from the LED passes, according to one embodiment.

FIG. 6 is, substantially similar to FIG. 5, shows a cross-sectional view taken along a line going through one of the plurality of LEDs 28, in the width direction of the first housing 101. As shown in FIG. 6, since the light emitting surface 281 of the LED 28 is mounted on the extending part 272 of the flexible substrate 27 so that the light emitting surface 281 faces the width direction of the first housing 101, the light emitted from the LEDs 28 is efficiently directed into the light guide 24 which faces the light emitting surface 281 of the LEDs 28. And the light directed into the light guide 24 is guided to the light diffusion part 251 of the double-sided tape 25, while being diffused by the light guide 24. Since the slope surface 241 is formed on the light guide 24 surface facing the inside of the first housing 101 and being adhered to the double-sided tape 25, the light directed into the light guide 24 is efficiently guided to the light diffusion part 251 of the double-sided tape 25 and the edge area 211 of the rear plate 21.

Since the light diffusion part 251 is formed of a material having a high light diffusion rate and reflection rate, the light directed on the double-sided tape 25 via the light guide 24 is further diffused and reflected in a direction to the first light transmission part 213 of the rear plate 21 by the light diffusion part 251, and directed again into the light guide 24 so that the light faces the thickness direction of the first housing 101. And, the light directed again into the light guide 24 is guided to an outer side of the first housing 101, and as a result, directed into the second light transmission part 231 of the double-sided tape 23. Since the second light transmission part 231 is formed of a material having a high light transmission rate as mentioned above, the directed light is transmitted into the first light transmission part 213 of the rear plate 21 almost without being blocked. And, since the first light transmission part 213 of the rear plate 21 is also formed of a material having a high light transmission rate as same as the second light transmission part 231 of the double-sided tape 23, the light directed into the first light transmission part 213 is emitted to the outside of the first housing 101 almost without being blocked.

On the other hand, the light emitted from the emitting surface 281 of the LEDs 28 includes light which is emitted directly to the outside of the first housing 101 without going through the light guide 24, or light which is emitted to the inside of the first housing 101, other than the light which is directed into the light guide 24. However, since the light emitted directly to the outside of the first housing 101 from the LEDs 28 is directed on the double-sided tape 22 and the rear plate 21 which are formed of a material having a low light transmission rate, almost all of the light is blocked by the double-sided tape 22 and the rear plate 21. The light emitted from the LEDs 28 is efficiently emitted to the outside of the first housing 101 mainly along a route passing through the light guide 24, the double-sided tape 25, the light guide 24, the double-sided tape 23, the first light transmission part 213 of the rear plate 21, as shown by an arrow C.

Next, how the light emitted from the LEDs 28 is seen from the outside of the first housing 101 will be described, according to one embodiment.

Figure 7:
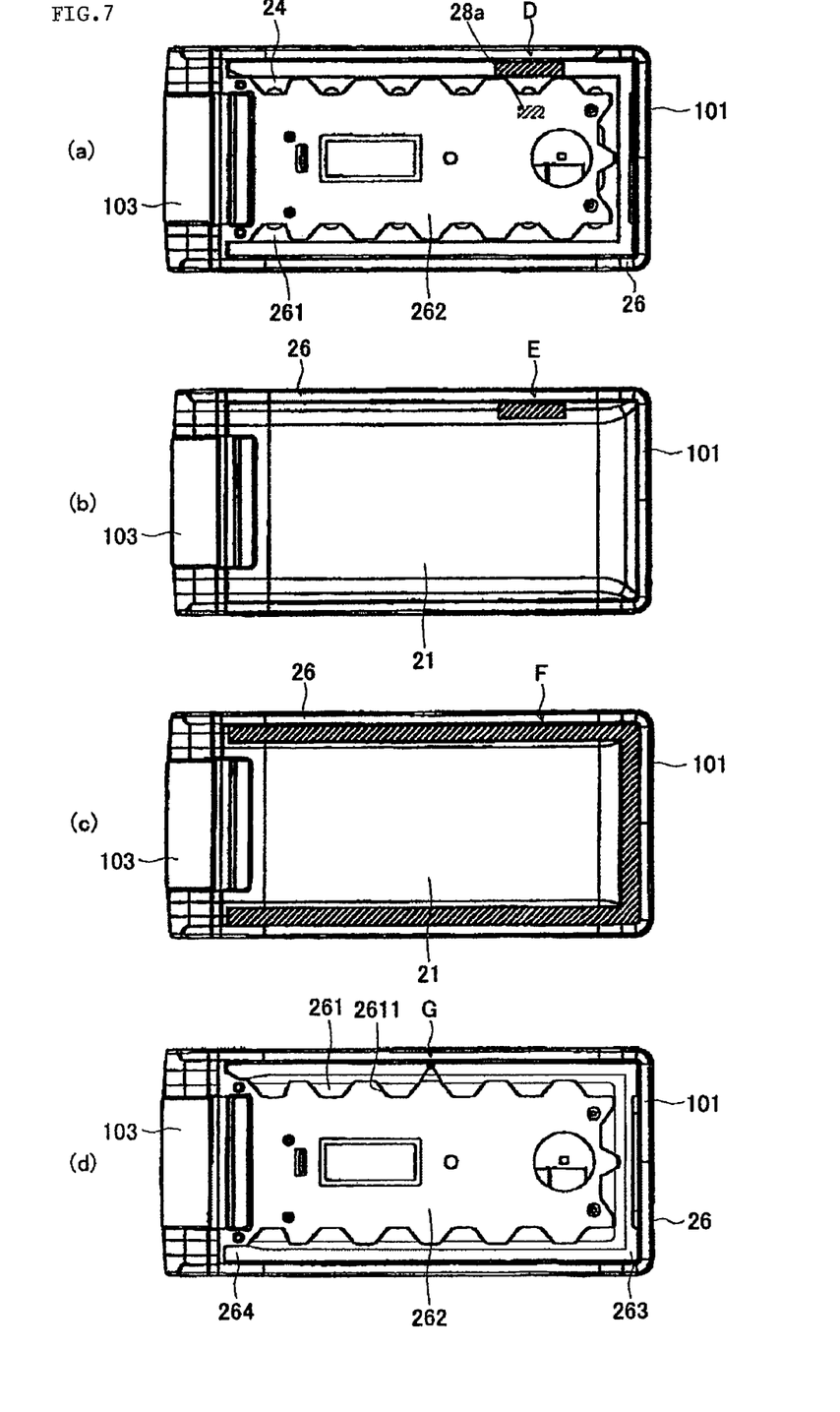
FIGS. 7(A)-7(D) illustrate how the light emitted from the LED is seen from the outside, according to one embodiment.

FIG. 7 illustrates how the light emitted from the LED 28 is seen from the outside. FIG. 7A is a diagram illustrating an appearance seen from the outside front of the exemplary rear case 26 when light is emitted from a single LED 28a in a condition that the rear plate 21 is removed. FIG. 7B is a diagram illustrating an appearance seen from the outside front of the rear case 26 when light is emitted from a single LED 28 in a condition that the rear plate 21 is placed. FIG. 7C is a diagram illustrating an appearance seen from the outside front of the rear case 26 when light is emitted from the plurality of LEDs 28 at the same time in a condition that the rear plate 21 is placed. FIG. 7D is a diagram illustrating a position where extended lines in slope directions from the slope parts 2611 of adjacent two openings 261 cross each other in a condition that the rear plate 21 is removed.

As shown in FIG. 7A, since the openings 261 of the rear case 26 are formed in approximately a radial fashion around the LED 28 as its center, for example, the light emitted from the LED 28a shown in FIG. 7A is diffused in a radial fashion by the light guide 24 and the light diffusion part 251 by a control of the controller of the flexible substrate 27, and as a result, an area specified by an extent D (shaded area) in FIG. 7A is seen emitting light when seen from the outside front of the rear case 26. As shown in FIG. 7B, regarding this light, an area specified by an extent E (shaded area) is seen emitting light after the rear plate 21 is placed when seen from the outside front of the rear case 26. On the other hand, as shown in FIG. 7C, when the plurality of LEDs 28 emit light at the same time by a control of the controller of the flexible substrate 27, the light which is emitted from each LED 28 and diffused in a radial fashion by the light guide 24 and the light diffusion part 251 is connected each other. As a result, an extent F (shaded area), which is an example of a first area of this embodiment, in other words, almost all areas of the first light transmission part 213 are seen emitting light when seen from the outside front of the rear case 26.

Here, as shown in FIG. 7D, the extended lines of the slope parts 2611 which constitute the light guiding part 2612 which are joined to two openings 261 adjacent to each other are formed to cross at a point G shown in FIG. 7D, in other words, on an extent F shown in FIG. 7C. It means that the light which is emitted from the plurality of adjacent LEDs 28 and diffused in a radial fashion by the light guide 24 and the light diffusion part 251 rarely interfere each other until reaching the area of the extent F in FIG. 7C, and also does not generate gaps. By the above configuration, the mobile terminal 100 of the embodiment can shine the area in the extent F shown in FIG. 7C without unevenness of light strength. And, by shining only one of the plurality of LEDs 28, and arbitrarily combining areas each of which can be shone by a single LED 28 as shown in FIG. 7A, large areas with a lot of flexibility can be arbitrarily shone. As described above, according to the mobile terminal 100 of the embodiment, since the LED 28 is formed near the upper base of the opening 261 which is formed to an approximately trapezoid shape, by diffusing the light emitted from the LED 28 along the light guiding part 2612 which is the slope part 2611 tilting against the width direction of the first housing 101 and joined to side lines of the trapezoid shape of the opening 261, the light is guided to the first area $_{[k1]}$ which is larger than the area of the openings 261 and the first area can be suitably shone. In fact, it is possible to secure a large light emitting area while suppressing a decrease in the strength of the first housing 101. According to the mobile terminal 100 of the embodiment, two slope-direction extended lines of two close slope parts 2611 tilting against the width direction of the first housing 101 which constitute the light guiding part 2612 which is joined to two openings 261 adjacent to each other are formed to cross in the first area. Therefore, the light emitted from the plurality of adjacent LEDs 28 can shine the first area without unevenness, without generating gaps, and with little overlapping. And, according to the mobile terminal 100 of the embodiment, large areas with a lot of flexibility can be arbitrarily shone, by emitting light from only given LEDs 28 out of the plurality of LEDs 28.

As described above, according to the mobile terminal 100 of one embodiment, the light emitted from the LED 28 is efficiently directed into the light guide 24 facing the emitting surface 281 of the LED 28, and the light directed into the light guide 24 is guided to the light diffusion part 251 of the double-sided tape 25 while being diffused by the light guide 24. The light directed on the double-sided tape 25 is further diffused and reflected by the light diffusion part 251 having a high light diffusion rate and reflection rate to the first light transmission part 213 of the rear plate 21, directed again into the light guide 24 and directed into the second light transmission part 231 of the double-sided tape 23. The light directed into the second light transmission part 231 is transmitted, almost without being blocked, through the second light transmission part 231 and the first light transmission part 213 both of which are formed of a material having a high light transmission rate, and emitted to the outside of the first housing 101. That is to say, in the mobile terminal 100 of the embodiment, since the light from the LED 28 is reflected and diffused by the light diffusion part 251 and directed into the first light transmission part 213, it is not necessary to arrange correspondingly the positions of the LEDs 28 and the first light transmission part 213. Because of this, a design flexibility of the light emitting structure in the first housing 101 increases, an efficient structure can be designed, and at the same time, the strength of the first housing 101 can be maintained. And, since the light emitted from the LED 28 to the width direction of the housing (a plane direction) is diffused and reflected to the thickness direction of the first housing 101 by the double-sided tape 25, it is not necessary to place the LED 28 in the thickness direction of the first housing 101 so that a thinning of the first housing 101 in the thickness direction can be suitably designed.

According to the mobile terminal 100 of one embodiment, the double-sided tape 25 is formed of a material having a high light diffusion rate and reflection rate (for example, a material colored by white type color) to constitute the light diffusion part 251. And, the double-sided tape 22 adhered to the center area 212 of the rear plate 21 is formed of a material having a low light transmission rate, for example, a material colored by black type color, to constitute the light shield part 221. Furthermore, the double-sided tape 22 adhered to the edge area 211 of the rear plate 21 is formed of a material having a high light transmission rate, for example, a transparent material or a semi-transparent material, to constitute the second light transmission part 231. Therefore, since the light diffusion part 251, the second light transmission part 231, and the light shield part 221 are integrated together with the double-sided tapes 25, 23, 22 for adhering and fixing the constitution elements respectively, the number of parts can be decreased. According to the mobile terminal 100 of the embodiment, since the light diffusion part 251 is arranged in the first housing 101 to correspond to the position, size, and extent of the light diffusion part 251 of the rear plate 21, the light which is emitted from the LED 28 and diffused along the light guiding part 2612 can be suitably diffused and reflected to the area of the predetermined position.

According to the mobile terminal 100 of one embodiment, since the light directly emitted to the outside of the first housing 101 from the LED 28 is directed on the double-sided tape 22 and the rear plate 21 both of which are formed of a material having a low light transmission rate, most of the light is blocked by the double-sided tape 22 and the rear plate 21. As a result, the light emitted from the LED 28 is efficiently directed into the light guide 24 which guides the light to the light diffusion part 251 of the double-sided tape 25 which reflects and diffuses the light in order to emit the light to the outside of the first housing 101, and a light leak to other parts can be suppressed. Because of this, the light from the LED 28 can be efficiently emitted to the outside.

According to the mobile terminal 100 of one embodiment, since the slope surface 241 is formed in the light guide 24 on a surface which faces the inside of the first housing 101 and is adhered to the double-sided tape 25, the light directed into the light guide 24 is efficiently guided to the light diffusion part 251 of the double-sided tape 25 and the edge area 211 of the rear plate 21.

The present invention is not limited to the above embodiments.

Specifically, in the practice of the present invention, various modifications, combinations, sub-combinations, and alterations to the elements of the above embodiment can be performed within the technical scope of the present invention or the equivalent thereof. In the above embodiment, although the mobile terminal 100 is a foldable mobile phone, the present invention is not limited to this. It may be an electronic device having a light emitting structure, such as a mobile phone other than a foldable type, or a PDA (Personal Digital Assistant), etc.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A mobile terminal, comprising:
   a plurality of light sources;
   a base comprising a plurality of openings, each of the plurality of openings corresponding to a respective one of the plurality of light sources wherein light emitted from each of the light sources passes through a corresponding opening;
   a light reflector located in an area which is at least a part of an outer circumference of the base, and operable to reflect light passing through the plurality of openings; and
   a light guide having a shape corresponding to a shape of the light reflector wherein the light reflected at the light reflector passes through the light guide.

2. The mobile terminal according to claim 1, wherein at least two adjacent light guides of the plurality of light guides are arranged with lines extended from each surface thereof crossing each other in the area.

3. The mobile terminal according to claim 1, further comprising
   a light guide located between one of the at least one light source and the light reflector.

4. The mobile terminal according to claim 3, wherein the light guide comprises a light transmissive resin, and
   the light transmissive resin contains a scattering material which scatters light through the light guide.

5. The mobile terminal according to claim 3, wherein the light reflector is connected to the light guide via an adhesive material.

6. The mobile terminal according to claim 1, wherein the base has a flat plate structure with a certain thickness, and
   the light reflector is configured to direct the light, which is emitted from the at least one light source, from a planar direction of the base to a thickness direction of the base.

7. The mobile terminal according to claim 1, further comprising
   a detector configured to detect a certain information, and
   a controller connected to the detector and the at least one light source, and configured to control the light sources to emit light corresponding to the certain information.

8. The mobile terminal according to claim 7, wherein the certain information is operating information of the mobile terminal.

* * * * *